(12) United States Patent
Cheng et al.

(10) Patent No.: US 10,555,342 B2
(45) Date of Patent: Feb. 4, 2020

(54) SYSTEM AND METHOD FOR ENERGY DETECTION WITH ADAPTIVE-THRESHOLD DUTY CYCLING FOR UNLICENSED BAND OPERATIONS

(71) Applicant: Telefonaktiebolaget LM Ericsson (publ), Stockholm (SE)

(72) Inventors: Jung-Fu Cheng, Fremont, CA (US); Håkan Andersson, Linköping (SE); Ashim Biswas, Linköping (SE); Daniel Figueiredo, Stockholm (SE); John Skördeman, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/765,936

(22) PCT Filed: Oct. 5, 2016

(86) PCT No.: PCT/SE2016/050948
§ 371 (c)(1),
(2) Date: Apr. 4, 2018

(87) PCT Pub. No.: WO2017/061934
PCT Pub. Date: Apr. 13, 2017

(65) Prior Publication Data
US 2018/0288804 A1    Oct. 4, 2018

Related U.S. Application Data

(60) Provisional application No. 62/237,811, filed on Oct. 6, 2015.

(51) Int. Cl.
*H04W 74/08* (2009.01)
*H04W 16/14* (2009.01)
(Continued)

(52) U.S. Cl.
CPC ........ *H04W 74/0816* (2013.01); *H04B 17/26* (2015.01); *H04B 17/318* (2015.01); *H04B 17/382* (2015.01); *H04W 16/14* (2013.01)

(58) Field of Classification Search
None
See application file for complete search history.

(56) References Cited

U.S. PATENT DOCUMENTS

| | | | |
|---|---|---|---|
| 2004/0229659 A1 | 11/2004 | Boos et al. | |
| 2007/0060155 A1* | 3/2007 | Kahana | H04W 72/085 455/450 |

(Continued)

OTHER PUBLICATIONS

Nama, "LTE-U with best-effort LBT", U.S. Appl. No. 62/236,311, filed Oct. 2, 2015 (Year: 2015).*

(Continued)

*Primary Examiner* — Thinh D Tran
(74) *Attorney, Agent, or Firm* — Sage Patent Group

(57) ABSTRACT

According to certain embodiments, a method by a radio node (110, 115) operating in multiple modes for power detection includes operating in a first mode. While operating in the first mode power levels of transmissions on a channel are compared to a first threshold to determine whether the channel is free. While operating the radio node (110, 115) in the first mode, power levels within a specified range are detected during a first time period. In response to detecting the power levels within the specified range during the first time period, the radio node (110, 115) is switched to a second mode that is a duty-cycle mode. While operating the radio node (110, 115) in the second mode, the power levels of the transmissions on the channel are compared to a second threshold during a first portion of a duty cycle and to a third threshold during a second portion of the duty cycle to determine whether the channel is free. The third threshold is (Continued)

different from the second threshold. In response to determining that the channel is free, transmission is initiated on the channel.

26 Claims, 7 Drawing Sheets

(51) Int. Cl.
    *H04B 17/26*     (2015.01)
    *H04B 17/318*     (2015.01)
    *H04B 17/382*     (2015.01)

(56) References Cited

U.S. PATENT DOCUMENTS

| | | | |
|---|---|---|---|
| 2008/0182574 A1 | 7/2008 | Haartsen | |
| 2014/0269292 A1* | 9/2014 | Kalkunte | H04L 45/123 370/232 |
| 2015/0296384 A1* | 10/2015 | Sadek | H04W 16/14 455/452.1 |
| 2016/0021661 A1* | 1/2016 | Yerramalli | H04W 16/14 370/329 |
| 2016/0164646 A1* | 6/2016 | Kwon | H04L 43/16 370/252 |
| 2016/0309463 A1* | 10/2016 | Khawer | H04W 72/0446 |
| 2017/0099666 A1* | 4/2017 | Nama | H04W 28/26 |
| 2017/0099679 A1* | 4/2017 | Zhang | H04W 16/14 |

OTHER PUBLICATIONS

PCT International Search Report for International application No. PCT/SE2016/050948—dated Dec. 12, 2016.
3GPP TSG RAN WG1 Meeting #82bis; Malmo, Sweden; Source: Ericsson; Title: On Adaptation of the Energy Detection Threshold for LAA (R1-156037)—Oct. 5-9, 2015.
ETSI EN 301 893 v1.8.1; Harmonized European Standard; Broadband Radio Access Networks (BRAN); 5 GHz high performance RLAN; Harmonized EN covering the essential requirements of article 3.2 of the R&TTE Directive—Mar. 2015.
Draft ETSI EN 301 893 v1.7.2; Harmonized European Standard; Broadband Radio Access Networks (BRAN); 5 GHz high performance RLAN; Harmonized EN covering the essential requirements of article 3.2 of the R&TTE Directive—Jul. 2014.

* cited by examiner

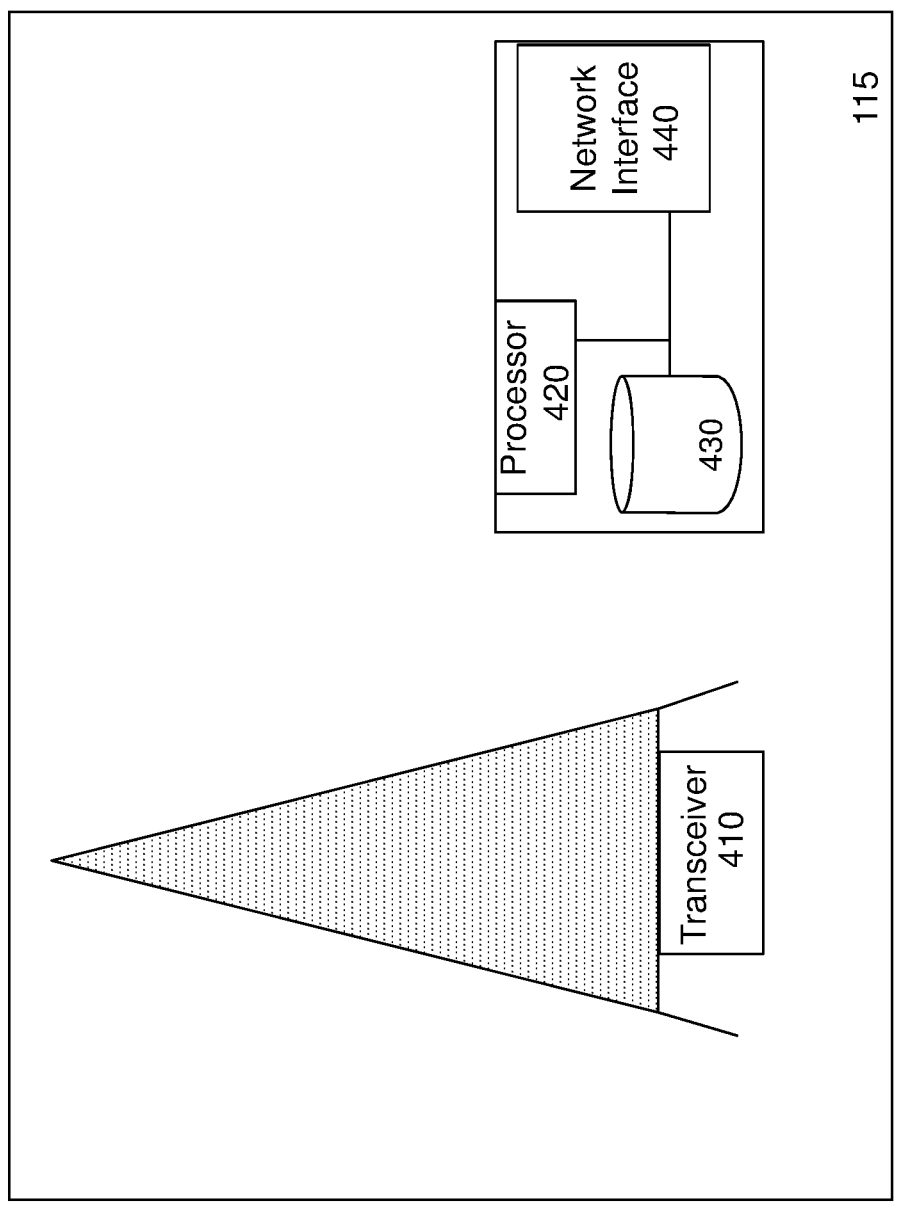

SYSTEM AND METHOD FOR ENERGY DETECTION WITH ADAPTIVE-THRESHOLD DUTY CYCLING FOR UNLICENSED BAND OPERATIONS

PRIORITY

This nonprovisional application is a U.S. National Stage Filing under 35 U.S.C. § 371 of international Patent Application Serial No. PCT/SE2016/050948 filed Oct. 5, 2016, and entitled "System and Method For Energy Detection With Adaptive-Threshold Duty Cycling For Unlicensed Band Operations" which claims priority to U.S. Provisional Patent Application No. 62/237,811 filed Oct. 6, 2015, both of which are hereby incorporated by reference in their entirety.

TECHNICAL FIELD

Particular embodiments relate generally to wireless communications and more particularly to system and method for energy detection with adaptive-threshold duty cycling for unlicensed band operations.

BACKGROUND

IEEE 802.11 is a set of Medium-Access Control (MAC) and Physical layer (PHY) specifications for implementing WLAN, also known as Wi-Fi, computer communication in the 2.4, 3.6, 5 and 60 GHz frequency bands. The specifications were created and maintained by the IEEE Standards Committee IEEE 802. The base version of the standard was released in 1997 and has had subsequent amendments. The standard and amendments provide the specification basis for wireless network products using the Wi-Fi bands.

Typically, LTE-U refers to a version of LTE operating in the unlicensed band. Such LTE deployment would use the unlicensed spectrum that is today generally used by Wi-Fi. There are two main approaches to LTE usages in unlicensed spectrum, LTE-U as stand-alone and License-Assisted Access via LTE (LAA-LTE). In the first approach, LTE transmits all its carriers in unlicensed spectrum, while in the second LAA LTE is used as a "secondary carrier" in the unlicensed spectrum but with a primary carrier in a licensed band.

LAA-LTE is one of the main work items for the 3GPP LTE Release 13 standard being proposed as a technology for operation on both licensed and unlicensed spectrum.

In an LAA-LTE deployment, the User Equipment (UE), which may also be called a wireless device, connects to an LTE network on a regular, licensed spectrum band, the so-called P-cell (Primary cell). Additionally, the UE may also be connected to the same network on an unlicensed spectrum, the S-cell (Secondary cell). There may be more than one S-cell, i.e., more than one carrier in the unlicensed band. The unlicensed carrier can be used to off-load the licensed carrier for data whenever it is available. In this way the licensed carrier can be used for robust control signaling and the unlicensed carrier mainly used to boost user-data rates in a best-effort fashion.

Listen-Before-Talk (LBT) is a protocol where the desired channel on the wireless medium is first sensed for any potentially interfering transmissions before a transmission begins. If the medium is found to be free, then the transmitter can start using it. Together with a back-off mechanism, an LBT-protocol potentially avoids collisions. The LBT protocols usually consist of a number of steps that include:

Listen to medium measure the received signal with procedures such as Clear-Channel Assessment (CCA).

Decision of medium busy/free based on energy detection and/or decoding of signal.

Start transmission if medium is free, or after a defined back-off period, the system starts the transmission.

In order to sense if the channel is busy, one can average the energy over a period of time or look at instantaneous peaks. An average over time, which is in effect low-pass filtering, has less false positives than an instantaneous measurement and decision. On the other hand, the method takes longer since it has to sense the channel and average the energy over some period of time.

In a radio-access network with more than two nodes, there is the potential of so-called hidden nodes. FIG. 1 illustrates an example hidden node situation in a wireless network. This situation consists of some nodes (set A) that can hear, and can be heard by, some other set of nodes (set B). There is also a third set of nodes (set C), which can hear, and is heard by, set A. However, nodes in set B and set C cannot hear each other. This is a problem for nodes in set B and set C when assessing the channel in preparation for transmission to nodes in set A. They cannot hear on-going transmissions towards an A-node that is transmitted from nodes in the other set.

Existing solutions in LTE-U for doing channel assessment using LBT utilize a fixed power threshold in all situations to determine whether or not the channel is busy. This can be particularly problematic in a coexistence scenario with Wi-Fi and can lead to unwanted degradation of the Wi-Fi performance. This is a variant of the hidden node problem. The Wi-Fi transmitter performs channel assessment and deems the channel to be free. It then transmits and during this time an LTE-U node doing LBT will detect the channel as busy. However, the Wi-Fi receiver will shortly thereafter transmit an ACK/NACK without doing a new LBT. This is part of the Wi-Fi protocol and all Wi-Fi nodes that decode the preamble of the initial transmission will know to wait for the ACK/NACK to go through.

The LBT-mechanism employed by LTE-U units is constructed with defer periods such that the short gap between the initial Wi-Fi transmission and the ACK/NACK is not regarded as a free channel. However, a problem occurs when the power level of the ACK/NACK is lower than the power level of the initial Wi-Fi transmission. This would typically happen when the initial transmission is from the Wi-Fi access point (AP) since the Wi-Fi stations commonly transmit with lower power. The ACK/NACK may not be detected by the LTE-U, and hence, potentially overrun by an LTE-U transmission. The reverse situation is also possible, with the LTE-U unit close to the Wi-Fi station, thus sensing the initial transmission from the station but not being able to hear the ACK/NACK from the AP.

The severity of the problem lies in the fact that the initial Wi-Fi transmission is never acknowledged (although it was in all likelihood received correctly) because the ACK/NACK was interfered. This then causes the transmitting Wi-Fi unit to back off further by increasing the contention window, and thus further reducing the chance of the WiFi-transmission getting sent successfully.

A similar situation may occur in a wastage of spectrum scenario. FIG. 2 illustrates an example wastage of spectrum scenario in a wireless network 10. Specifically, FIG. 2 illustrates an example embodiment wherein a roof-mounted Wi-Fi Access Point (AP) 12 and a Secondary Cell (S-Cell) eNodeB 14 exhibiting low pathloss. eNodeB 14 and Wi-Fi AP 12 can bear each other 16. However a collision 18 may occur at eNodeB 14.

As depicted, a Wi-Fi station 20 may transmit on uplink 22. As stated, above Wi-Fi station 20 transits at a power that is less than −62 dBM. Accordingly, it may not be detected by LTE-U node 24, which cannot hear an LTE-UE transmission 22 that is less than −62 dBm. In such a scenario the whole, or part of, the UL transmission 22 can potentially collide with a transmission 26 from the LTE-U node 24, thereby rendering both the Wi-Fi transmission 22 and LTE-U transmission 24 undecodable which leads to wastage of spectrum.

In general terms, FIG. 2 illustrates the scenario where the LTE-U eNodeB 14 and the Wi-Fi AP 12 are co-located, or at least close enough that they can hear each other. The links between the eNodeB 14 and the LTE-U node 24, and the Wi-Fi AP 12 and the Wi-Fi station 20, respectively, may be good. However, if the eNodeB 14 employs a CCA-ED threshold of −62 dBm, eNodeB 14 may not detect the Wi-Fi UL transmission 22 and, consequently, interfere the Wi-Fi reception at Wi-Fi AP 12 when eNodeB 14 transmits a downlink (DL) transmission 28 to the LTE-U node 24. This may also result in interference of the DL reception at the LTE-U node 24 if the LTE-U node 24 and the Wi-Fi station 20 can hear each other. Note also that a Wi-Fi DL transmission 30 may also be impacted if the corresponding ACK/NACK for the Wi-Fi DL transmission 30 gets caught in this scenario.

Problems may also exist in the reverse scenario. Specifically, the Wi-Fi AP 12 may be unable to detect the LTE-U UL transmission 26 when the power level of the transmission is below −62 dBm. Hence, the Wi-Fi AP 12 may transmit donwlink transmission 30 when the LTE-U node 24 transmits uplink transmission 28, which may result in interference at the eNodeB 14. Interference may also result at the Wi-Fi station 12 if the Wi-Fi station 12 is located near LTE-U node 24.

SUMMARY

According to certain embodiments, a method by a radio node operating in multiple modes for power detection includes operating in a first mode. While operating in the first mode, the power levels of transmissions on a channel are compared to a first threshold to determine whether the channel is free. While operating the radio node in the first mode, power levels within a specified range are detected during a first time period. In response to detecting the power levels within the specified range during the first time period, the radio node is switched to a second mode that is a duty-cycle mode. While operating the radio node in the second mode, the power levels of the transmissions on the channel are compared to a second threshold during a first portion of a duty cycle and to a third threshold during a second portion of the duty cycle to determine whether the channel is free. The third threshold is different from the second threshold. In response to determining that the channel is free, transmission is initiated on the channel.

According to certain embodiments, a radio node operating in multiple modes for power detection includes a memory storing instructions and a processor operable to execute the instructions. Executing the instructions causes the processor to operate in a first mode. While operating in the first mode, the processor compares power levels of transmissions on a channel to a first threshold to determine whether the channel is free. While operating in the first mode, the processor also detects that the power levels of the transmissions on the channel are within a specified range during a first time period. In response to the detection, the processor switches to a second mode that comprises a duty-cycle mode. While operating in the second mode, the processor compares the power levels of the transmissions on the channel to a second threshold during a first portion of a duty cycle and to a third threshold during a second portion of the duty cycle to determine whether the channel is free. The third threshold is different from the second threshold. In response to determining that the channel is free, the processor initiates transmission on the channel.

According to certain embodiments, a radio node is configured to operate in multiple modes for power detection. The radio node is further configured to, while operating in a first mode, compare power levels of transmissions on a channel to a first threshold to determine whether the channel is free. Additionally, while operating in the first mode, the radio node is further configured to detect that the power levels of the transmissions on the channel are within a specified range during a first time period. In response to detecting the power levels within the specified range during the first time period, the radio node is configured to switch to a second mode, wherein the second mode comprises a duty-cycle mode. While operating in the second mode comprising the duty-cycle mode, the radio is further configured to compare the power levels of the transmissions on the channel to a second threshold during a first portion of a duty cycle and to a third threshold during a second portion of the duty cycle to determine whether the channel is free. The third threshold is different from the second threshold. In response to determining that the channel is free, the radio node is further configured to initiate transmission on the channel.

According to certain embodiments, a computer program stored on a non-transitory computer-readable medium is executed by a processor to cause the processor to operate in a first mode. While operating in the first mode, the processor compares power levels of transmissions on a channel to a first threshold to determine whether the channel is free. While operating in the first mode, the processor also detects that the power levels of the transmissions on the channel are within a specified range during a first time period. In response to the detection, the processor switches to a second mode that comprises a duty-cycle mode. While operating in the second mode, the processor compares the power levels of the transmissions on the channel to a second threshold during a first portion of a duty cycle and to a third threshold during a second portion of the duty cycle to determine whether the channel is free. The third threshold is different from the second threshold. In response to determining that the channel is free, the processor initiates transmission on the channel.

Some embodiments of the disclosure may provide one or more technical advantages. For example, in certain embodiments, the systems and methods may improve LTE-U/Wi-Fi coexistence. For example, in particular embodiments, the systems and methods may result in the ACK/NACK transmissions from Wi-Fi nodes not being overrun by LTE-U transmissions when the LTE-U node fails to sense the channel as busy due to the lower power levels of the ACK/NACK. As a result, the Wi-Fi transmission may be successfully completed and the contention window of the transmitting Wi-Fi node may not have to be unnecessarily backed off.

Another technical advantage may be that the same teaching can also be practiced by the Wi-Fi nodes to protect LTE-U transmissions. Specifically, the systems and methods may result in LTE-U transmissions not being run over by Wi-Fi transmissions from Wi-Fi nodes when the Wi-Fi node fails to sense the channel as busy. As a result, the LTE-U transmission may be successfully completed.

Still another technical advantage may be that the systems and methods disclosed herein are applicable to WLAN/Wi-Fi systems as well as LTE systems. Additionally, techniques disclosed herein are equally applicable to the case when LTE runs as a stand-alone or as LAA-LTE.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 4 illustrates an example network node capable of operating in multiple modes for power detection, according to certain embodiments;

DETAILED DESCRIPTION

Systems and methods are provided that use adaptive-threshold duty cycling for power detection. More specifically, a duty-cycle scheme is provided that uses different Clear-Channel Assessment Energy Detection (CCA-ED) thresholds that may be adaptive based on noise-floor measurements and/or other factors. In certain embodiments, the ACK/NACKs of the Wi-Fi transmissions can be detected as "channel busy" in part of the cycle despite having lower signal strengths. As a result, the Wi-Fi transmissions by a Wi-Fi network node may avoid interference and succeed. In the other part of the cycle, a normal LBT-procedure that uses only a single CCA-ED threshold may be employed, thus avoiding putting the LTE-U network node at the disadvantage that the lower threshold from the first part of the cycle incurs.

Figure 1:
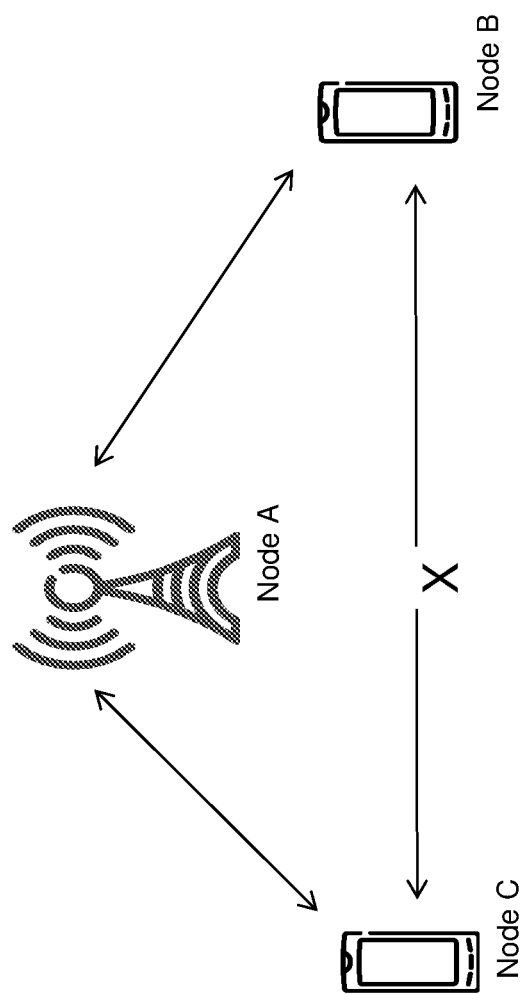
FIG. 1 illustrates an example hidden node situation in a wireless network, according to certain embodiments.
Figure 2:
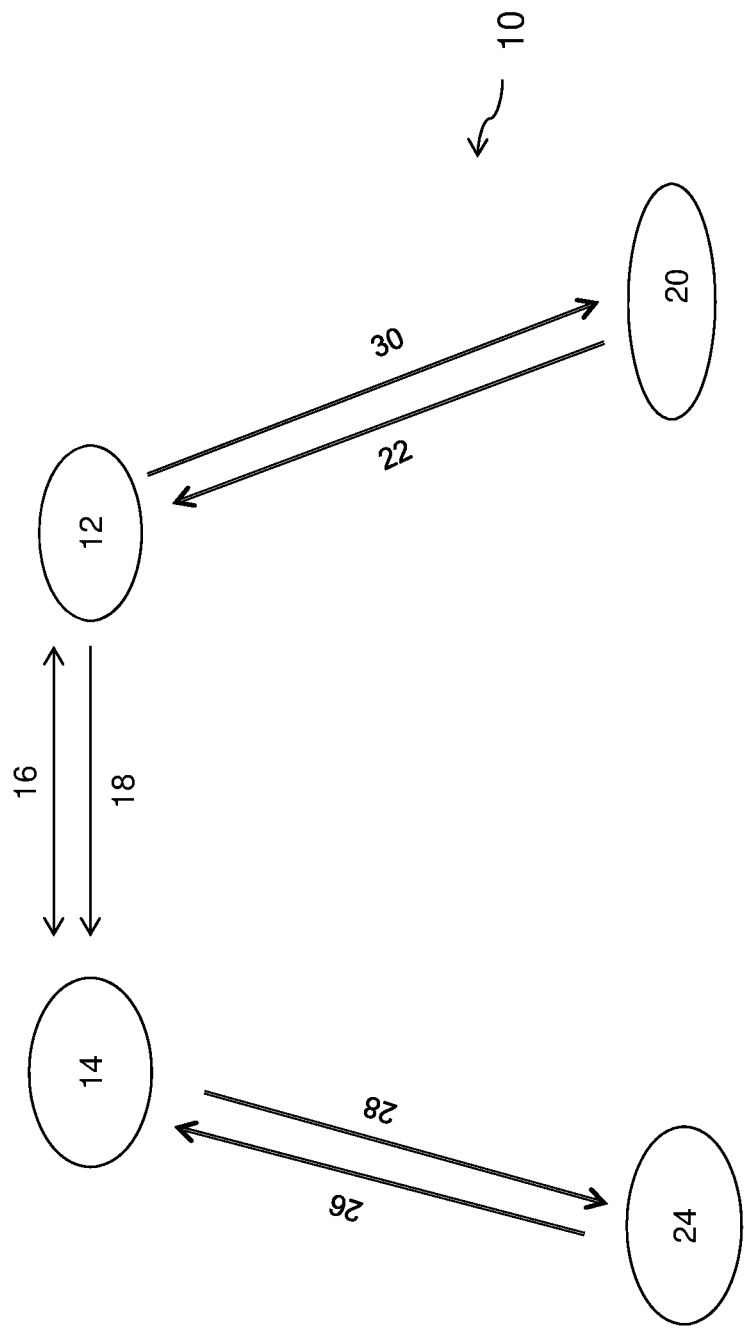
FIG. 2 illustrates another example of wastage of spectrum scenario in a wireless network, according to certain embodiments.
Figure 3:
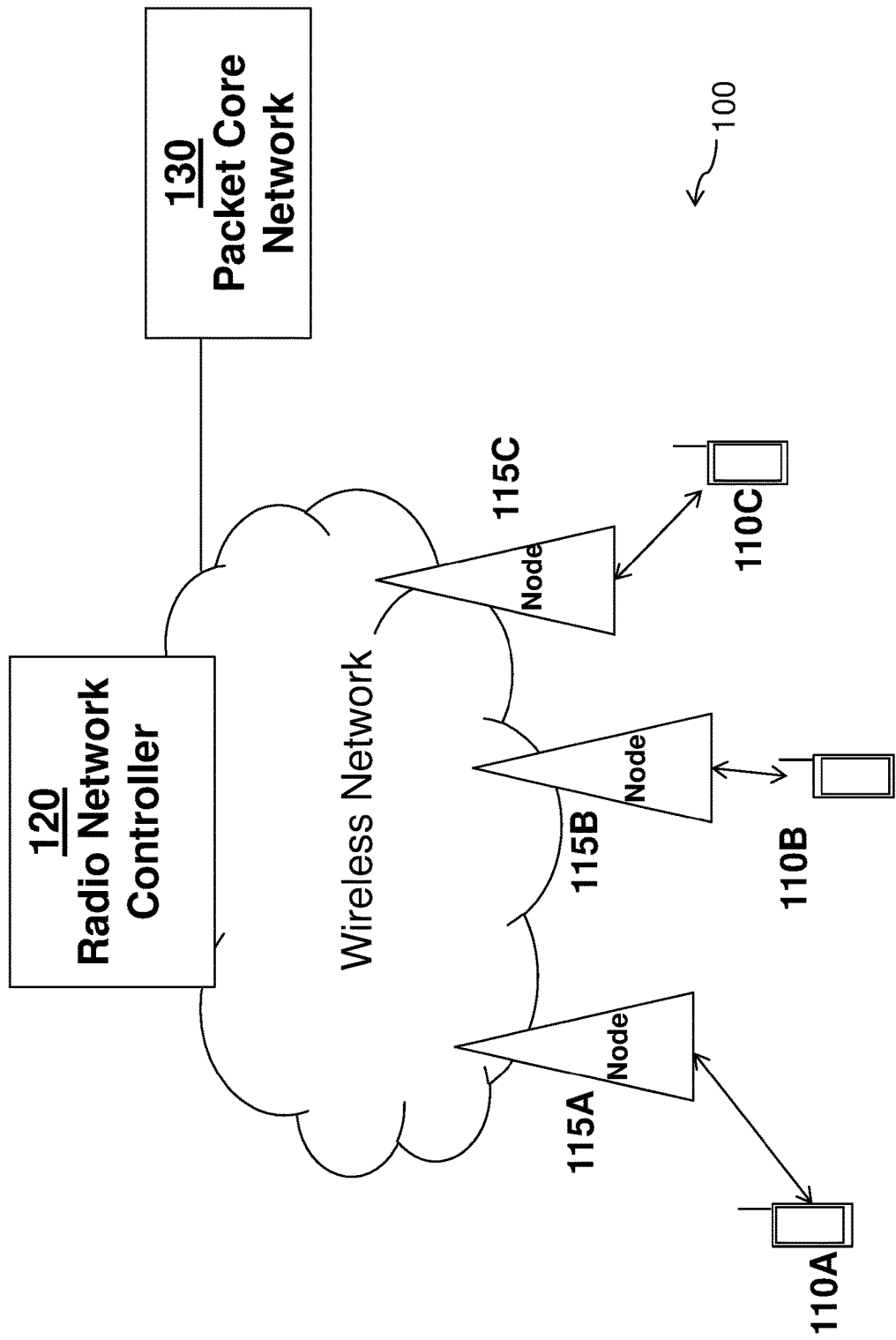
FIG. 3 illustrates an example wireless network that includes radio nodes operating in multiple modes for power detection, according to certain embodiments.

Particular embodiments are described in FIGS. 1-8 of the drawings, like numerals being used for like and corresponding parts of the various drawings. FIG. 3 is a block diagram illustrating embodiments of a radio network 100 that includes radio nodes that communicate with one another over a wireless interface. As illustrated, the radio nodes may include one or more wireless devices 110A-C, radio network nodes 115A-C, radio network controller 120, and core network nodes 130. A wireless device 510 may communicate with a radio network node 515 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless devices 110. Wireless device 110 may exchange certain signals with core network node 130 using the non-access stratum layer. In non-access stratum signaling, signals between wireless device 110 and core network node 130 may be transparently passed through the radio access network.

As described above, example embodiments of network 100 may include one or more wireless devices 110 and one or more other different types of radio nodes capable of communicating (directly or indirectly) with wireless devices 110. Examples of the other radio nodes include radio network nodes 115, 120, and core network nodes 130. The network 100 may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of radio network node 115, wireless device 110, and network nodes (such as radio network controller 120 or core network node 130) are described with respect to FIGS. 4, 5, and 8 below, respectively. The terms wireless device 110 and network node 115, as used herein, are considered general terms and are intended to be considered as non-limiting. For example, "network node" may correspond to any type of radio node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long-term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long-Term Evolution (LTE) technology. However, the scope of the disclosure is not limited to the examples and other embodiments could use different radio access technologies.

FIG. 4 is a block diagram illustrating certain embodiments of a network node 115. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 410, processor 420, memory 430, and network interface 440. In some embodiments, transceiver 410 facilitates transmitting wireless signals to and receiving wireless signals from wireless device 110A-C (e.g., via an antenna), processor 420 executes instructions to provide some or all of the functionality described above as being provided by a radio network node 115, memory 430 stores the instructions executed by processor 420, and network interface 440 communicates signals to backend network components, such as a gateway, switch, router, Internet, Public Switched Telephone Network (PSTN), core network nodes 130, radio network controllers 120, etc.

Processor 420 may include any suitable combination of hardware and software implemented in one or more modules to execute instructions and manipulate data to perform some or all of the described functions of network node 115. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random-Access Memory (RAM) or Read-Only Memory (ROM)), mass-storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for radio network node 115, send output from radio network node 115, perform suitable processing of the input or output or both, communicate to other devices, or any combination of the preceding. Network interface 440 may include appropriate hardware (e.g., port, modem, network-interface card, etc.) and software, including protocol conversion and data-processing capabilities, to communicate through a network.

Other embodiments of network node 115 may include additional components beyond those shown in FIG. 4 that may be responsible for providing certain aspects of the network node's functionality, including any of the functionality described above and/or any additional functionality (including any functionality necessary to support the solution described above). The various types of radio nodes may include components having the same physical hardware but configured (e.g., via programming) to support different radio-access technologies, or may represent partly or entirely different physical components.

Figure 5:
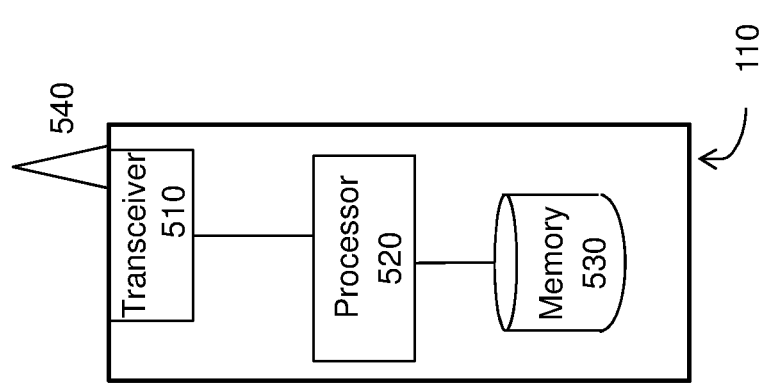
FIG. 5 illustrates an example wireless device capable of operating in multiple modes for power detection, according to certain embodiments.

FIG. 5 is a block diagram illustrating certain embodiments of a wireless device 110. As described above, a wireless device 110 may also be referred to as user equipment (UE), a station (STA), a device, or a terminal in some embodiments. Wireless device 110A-C includes transceiver 510, processor 520, and memory 530. In some embodiments, transceiver 510 facilitates transmitting wireless signals to and receiving wireless signals from network node 115 (e.g., via an antenna 540), processor 520 executes instructions to provide some or all of the functionality described above as being provided by wireless device 110A-C, and memory 530 stores the instructions executed by processor 520.

Processor 520 may include any suitable combination of hardware and software implemented in one or more modules to execute instructions and manipulate data to perform some or all of the described functions of wireless device 110A-C. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random-Access Memory (RAM) or Read-Only Memory (ROM)), mass-storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110A-C may include additional components beyond those shown in FIG. 5 that may be responsible for providing certain aspects of the wireless device's functionality, including any of the functionality described above and/or any additional functionality (including any functionality necessary to support the solution described above).

In certain embodiments, a radio node may use a Listen-Before-Talk (LBT) protocol to identify potentially interfering transmissions before the radio node initiates its own transmission. Specifically, wireless devices 110 and network nodes 115 may measure the received signal with procedures such as Clear-Channel Assessment (CCA), determine if the channel is free based on energy detection on the channel, and initiate transmission is if the channel is free or after a defined back-off period.

In certain embodiments, for example, the energy over a period of time may be averaged. In other embodiments, radio nodes may look at instantaneous peaks in energy. However, where a radio node operates at a differing power level from other radio nodes, there is a potential for one or more radio nodes to be inadvertently hidden from other radio nodes. For example, in one example scenario, a first network node 115A may include a LTE-U node and a second network node 115B may include a Wi-Fi node. Such nodes may operate at different power levels that may be undetectable when a node is operating in a normal mode of operation that uses a fixed power threshold to determine the energy level on a channel and whether or not the channel is busy. For example, the Wi-Fi node may perform channel assessment and deem the channel to be free. The Wi-Fi node may then transmit a signal. During this time, the LTE-U node using LBT protocol may detect the channel as busy. However, the Wi-Fi node will shortly thereafter transmit an ACK/NACK without doing a new LBT procedure.

The LBT-mechanism employed by LTE-U units is constructed with defer periods such that the short gap between the initial Wi-Fi transmission and the ACK/NACK is not regarded as a free channel. However, a problem occurs when the power level of the ACK/NACK is lower than the power level of the initial Wi-Fi transmission. This would typically happen when the initial transmission is from a Wi-Fi access point (AP) since the Wi-Fi stations commonly transmit with lower power. The ACK/NACK may not be detected by the LTE-U node, and hence, potentially be overrun by an LTE-U transmission. Obviously, the situation can be the other way around as well with the LTE-U unit close to the Wi-Fi station, thus sensing the initial transmission from the station but not being able to hear the ACK/NACK from the AP.

In certain embodiments, one or more of wireless devices 110, network nodes 115, or another radio node may employ a duty-cycle scheme with different CCA-ED thresholds for use in detecting energy. The differing CCA-ED thresholds may be selected and may vary based on operating conditions.

Figure 6:
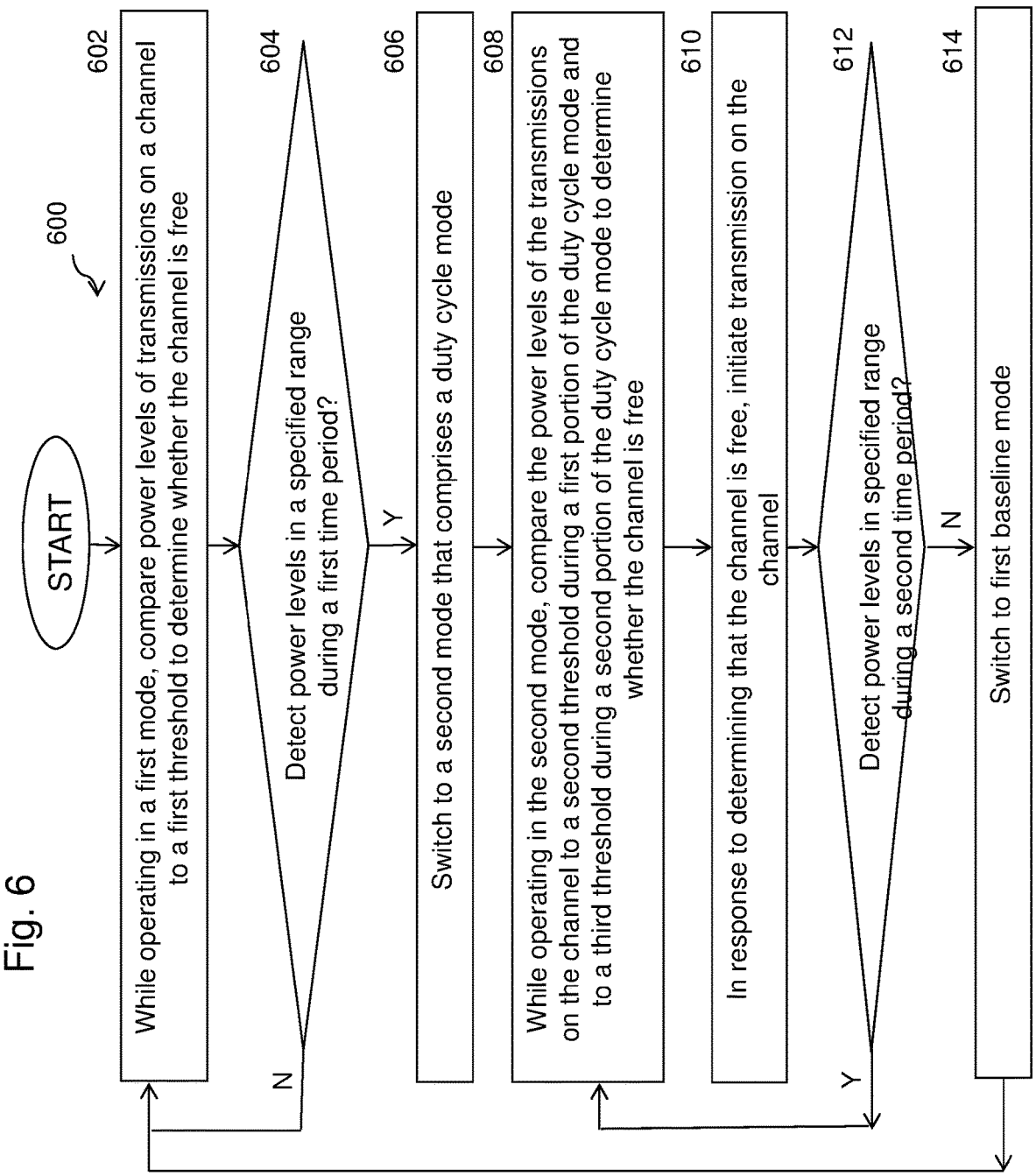
FIG. 6 illustrates an exemplary method employing a duty-cycle scheme using multiple modes for power detection, according to certain embodiments.

FIG. 6 illustrates an exemplary method 600 employing a duty-cycle method using multiple modes for power detection, according to certain embodiments. The method modifies and/or improves upon a baseline LBT-mechanism utilizing a single CCA-ED threshold value to determine channel occupancy. The baseline LBT-mechanism may be, for example, as described in ETSI EN 301 893. The method begins while the radio node operates in the first mode and monitors transmissions on a channel. As described above, the radio node may include a wireless device 110, network node 115, or another node. In a particular embodiment, the radio node may include an LTE-U node. In other embodiments, the radio node may include a Wi-Fi node.

At step 602, the radio node, which may include wireless device 110, network node 115, or another node, compares power levels of transmissions on a channel to the first threshold. In a particular embodiment, for example, the baseline LBT-mechanism may use a CCA-ED threshold of −62 dBm for energy detection. In another embodiment, for example, the baseline LBT-mechanism may use a CCA-ED threshold of −72 dBM. This baseline CCA-ED threshold may be referred to as the first threshold. However, −62 and −72 dBm are provided merely as example thresholds and it is recognized that any suitable power level may be used as the first threshold. In certain embodiments, this step may be performed whenever the radio node is not transmitting. This may include both when the wireless device 110 or network node 115 has no data to transmit and/or when the wireless device 110 or network node 115 is performing a listen-before-talk (LBT) procedure.

At step 604, a determination is made as to whether detected power levels are within a specified range during a first time period. In a particular embodiment, for example, the specified range may be between −82 and −62 dBm for a certain duration, e.g. x ms. Thus, in one particular exemplary embodiment, a higher level of −62 dBm may be used, and a lower level of −82 dBm may be used. The lower level of the detection interval, given as −82 dBm in the provided above, is also provided as just one example, and may be adjusted based on noise-floor measurements on the channel or other factors. Likewise, the higher level of −62 dBm may also be adjusted as appropriate. For example, in another particular embodiment, the specified range may be between −82 and −72 dBm for a certain duration, e.g. x ms. Thus, in this exemplary embodiment, a higher level of −72 dBm may be used in lieu of a higher level of −62 dBm. In certain embodiments, the detection method may include but is not restricted to:

triggering detection on a set percentage, which may be tunable or adaptive, of CCA-ED sample values being in a range of −82 to −62 dBm a range of −82 and −72 dBm, in particular embodiments, the duration of received signal power in a range of −82 to −62 dBm or a range of −82 to −72 dBm, in particular embodiments, filtering sample values over time before a decision is taken, tuning the length of the observation period, which may also be adaptive, counting a number of measurements between a range of −82 and −62 dBm or a range or a range of −82 dBm to −72 dBm, in particular embodiments, and determining that the number of measurements within certain time duration is greater than a predefined threshold.

If power levels within the specified range are not detected, the method returns to step 602 with the continued monitoring of power levels and the comparison of the power levels of transmissions on the channel to the first threshold. Thus, the radio node continues to operate in the LBT baseline mode of operation, using the first threshold as the sole threshold. By contrast, if power levels within the specified range are detected at 604, the method continues to step 606, where the radio node switches to a second mode, which is a duty-cycle mode.

At step 608, the radio node operates in the second mode and cycles between two different CCA-ED thresholds. More specifically, the radio node compares the power levels of the transmissions on the channel to a second threshold during a first portion of the duty cycle and to a third threshold during a second portion of the duty cycle. In a particular embodiment, the second CCA-ED threshold may be equal to the first threshold used during the first mode of operation. Thus, where the first threshold is −62 dBm, the second threshold may also be −62 dBm. Alternatively, where the first threshold is −72 dBm, the second threshold may also be −72 dBm In a particular embodiment, the third threshold may be −82 dBm. However, the provided thresholds are for example purposes only. It is recognized that such thresholds may be adapted based on the measured ambient noise floor or other factors. For example, a higher threshold may be used when the measured noise floor is higher. Other factors that may be used to adapted the first, second, and third thresholds may include:

antenna gain and number of transmit antennas,
    the maximum rated EIRP of the LAA transmission point within unlicensed band,
    the maximum EIRP within the transmission burst following the LBT procedure,
    the transmission bandwidth,
    deployment scenario: e.g., indoor or outdoor, and/or
    estimated load on the operating channel.

In certain embodiments, each portion of the duty cycle is y ms in duration, e.g. with y in the range of [10 . . . 25] ms. In other embodiments of the invention the value of y can be tunable (possibly adaptively) and/or the different cycles may have different durations, z and w ms, respectively. These can also be tunable, possibly adaptively.

At step 610, and in response to comparing the power levels of the transmissions to the appropriate thresholds for the appropriate portions of the duty cycle, the radio node determines that the channel is free and initiates transmission on the channel. A determination may then be made at step 612 as to whether power levels within a specified range have been detected during a second time period. If the radio node detects received signal levels within the specified range, the radio node returns to step 608 and the radio node continues to operate in the duty-cycle mode. For example, in the example embodiment described above, the radio node may detect received signal levels in the range of −82 and −62 dBm during the second time period. In another example embodiment, the radio node may detect received signal levels in the range of −82 to −72 dBm. As such, radio node may continue to operate in duty-cycle mode, using the two alternating thresholds described above.

If the radio node does not detect the received signal levels within the specified during the second time period at step 612, the method continues to step 614 where the radio node exits the duty-cycle mode and switches operation to the first, baseline mode.

In various embodiments, the triggering criteria may or may not be the exact inverse of the criteria for entering the duty-cycle mode. Different criteria may be used, or the upper and lower thresholds may be tuned differently in order to create a hysteresis in the behavior of entering/leaving the duty-cycle mode. In a particular embodiment, the duty-cycle mode may always be completed with both portions before the exit criteria is evaluated and a possible return to the first, baseline mode is possible. In another embodiment, the LBT-mechanism may exit the duty-cycle mode as soon as the exit criteria are met even if this happens mid-cycle.

Figure 7:
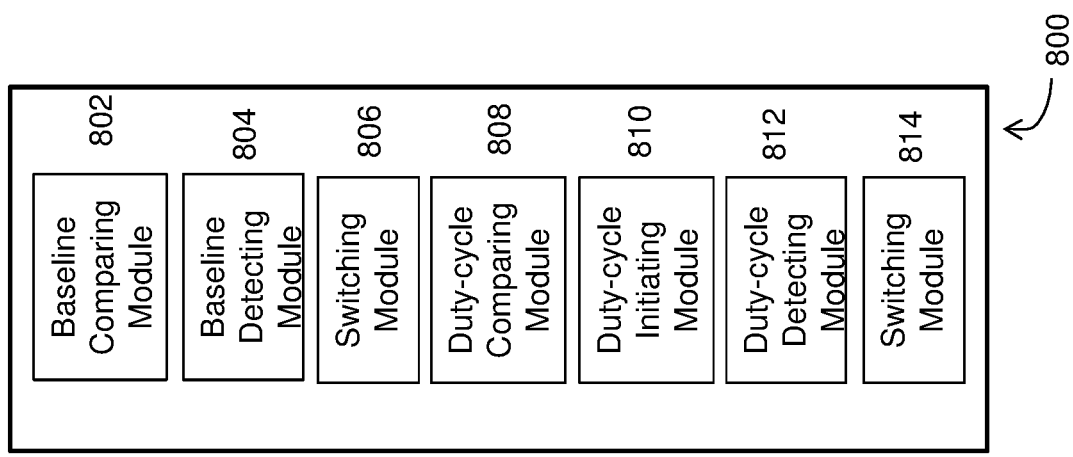
FIG. 7 illustrates an example virtual computing apparatus that employs a duty-cycle scheme using multiple modes for power detection, according to certain embodiments.

FIG. 7 illustrates an example virtual computing apparatus 700 employing a duty-cycle method using multiple modes for power detection, according to certain embodiments.

As depicted, the virtual apparatus 700 includes at least one baseline comparing module 702, at least one baseline detecting module 704, at least one baseline switching module 706, at least one duty-cycle comparing module 708, at least one duty-cycle initiating module 710, at least one duty-cycle detecting module 712, and at least one duty-cycle switching module 714.

Baseline comparing module 702 may perform the baseline comparing functions of the radio node, as described herein. For example, baseline comparing module 702 may monitor received power levels of transmissions on a channel while the radio node is in a first mode, which may be a baseline mode. As described above, in a particular embodiment, the radio node may perform a listen-before-talk procedure while in the first mode and may use a single threshold level of −62 dBm. In another embodiment, the radio node may use a single threshold level of −72 dBm or another suitable value for detecting power levels.

Baseline detecting module 704 may perform the baseline detecting functions of the radio node, as described herein. For example, baseline detecting module 704 may detect power levels within a first specified range for a first certain duration. In a particular embodiment, for example, the specified range may be between −82 and −62 dBm. As another example, the specified range may be between −82 and −72 dBm. In certain embodiments, the specified range may comprise a lower level that may be adjusted based on noise-floor measurements on the channel or other factors. In other embodiments, the specified range may comprise a set percentage of CCA-ED sample values being in the −82 and −62 dBm range. As another example, the specified range may comprise a set percentage of CCA-ED sample values being in the −82 to −72 dBm range. In a particular embodiment, the first time period may comprise a length of time comprising a tunable or adaptable observation period. In certain embodiments, detecting power levels within a first specified range for the first time period may include counting a number of measurements between −82 and −62 and activating the duty cycle if the number within certain time duration is greater than a predefined threshold. As another example, the number of measurements between −82 and −72 may be counted and the duty cycle may be activated if the number within the certain time frame is greater than the predefined threshold.

Baseline switching module 706 may perform the baseline switching functions of the radio node, as described herein. For example, baseline switching module 706 may transition the radio node into a duty-cycle mode in response to determining that power levels fall within the specified range for the first time duration.

Duty-cycle comparing module 708 may perform the duty-cycle comparing functions of the radio node, as described herein. For example, duty-cycle comparing module 708 may monitor received power levels of transmissions on the channel while the radio node is in the duty-cycle mode. In certain embodiments, duty-cycle comparing module 708 may cycle between two different CCA-ED thresholds.

Duty-cycle initiating module 710 may perform the initiating functions of the radio node, as described herein. For example, in response to comparing the power levels of the transmissions to the appropriate thresholds for the appropriate portions of the duty cycle, duty-cycle initiating module 710 may determine that the channel is free and initiate transmission on the channel.

Duty-cycle detecting module 712 may perform the duty-cycle detecting functions of the radio node, as described herein. For example, duty-cycle detecting module 712 may detect power levels to determine power levels within a specified range during a second time period while the network node is in the duty-cycle mode. In a particular embodiment, for example, the duty-cycle detecting module 712 may use a second CCA-ED threshold during a first portion of the duty-cycle mode and a third CCA-ED threshold during a second portion of the duty-cycle mode. For example, in a particular embodiment, the second threshold may be equal to −62 dBm and the third threshold may be equal to −82 dBm. In another example, the second threshold may be equal to −72 dBm and the third threshold may be equal to −82 dBm.

Duty-cycle switching module 714 may perform the duty-cycle switching functions of the radio node, as described herein. For example, duty-cycle switching module 714 may transition the radio node into the baseline mode in response to determining that power levels do not fall within the specified range during the second time period.

Other embodiments of the virtual computing apparatus may include additional components beyond those shown in FIG. 7 that may be responsible for providing certain aspects of the radio node's functionality, including any of the functionality described above and/or any additional functionality (including any functionality necessary to support the solution described above). Certain embodiments may also have fewer components. For example, the functions of baseline comparing module 702 and duty-cycle comparing module 708 may be combined into a single comparing module. Likewise, the functions of baseline detecting module 704 and duty-cycle detecting module 712 may be combined into a single detecting module, and the functions of baseline switching module 706 and duty-cycle switching module 714 may be combined into a single switching module.

Figure 8:
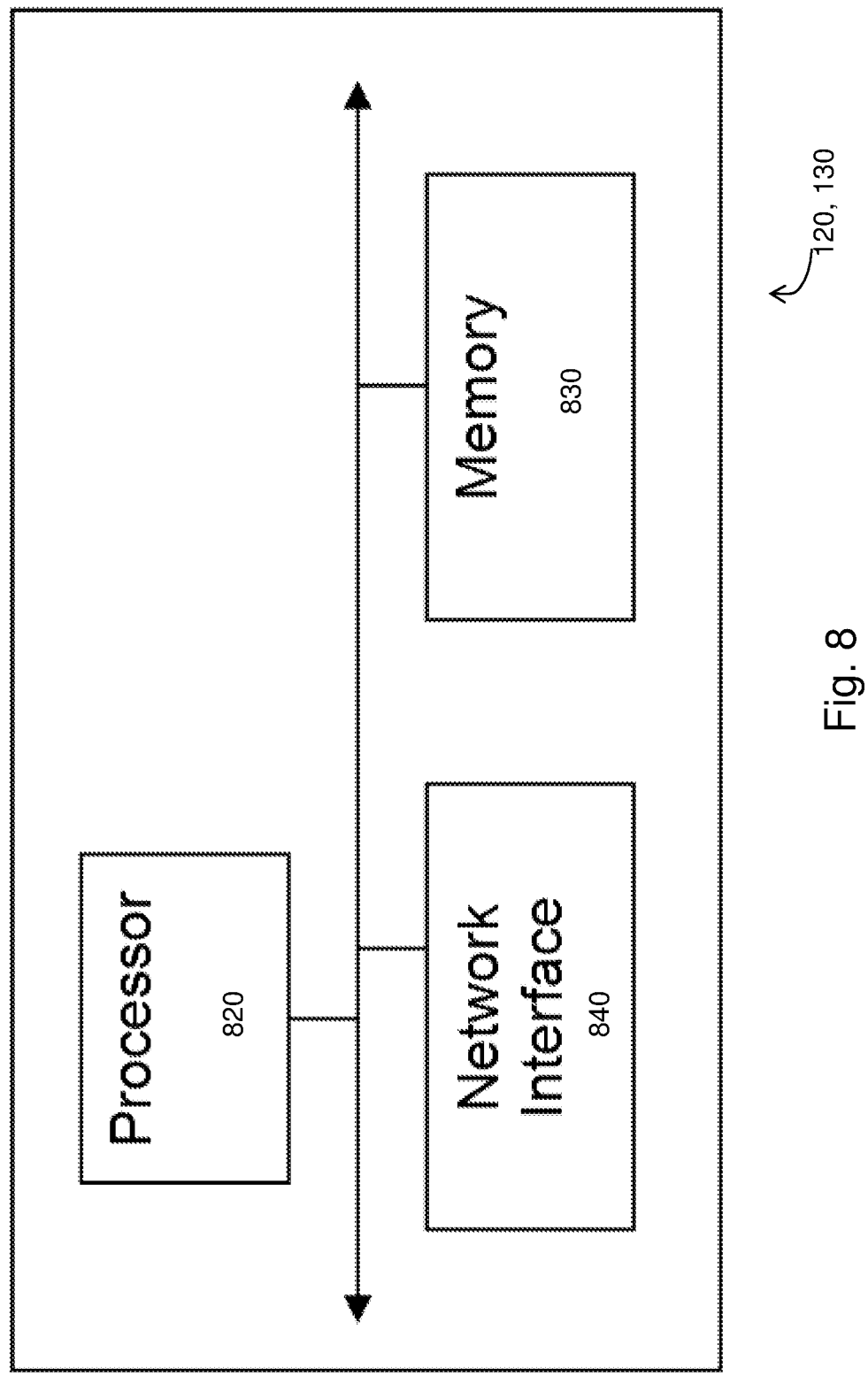
FIG. 8 illustrates an example radio network controller, according to certain embodiments.

FIG. 8 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to a suitable node, such as a gateway, switch, router, Internet, Public Switched Telephone Network (PSTN), radio network nodes 115, radio network controllers 120, core network nodes 130, etc.

Processor 820 may include any suitable combination of hardware and software implemented in one or more modules to execute instructions and manipulate data to perform some or all of the described functions of the network node. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random-Access Memory (RAM) or Read-Only Memory (ROM)), mass-storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network-interface card, etc.) and software, including protocol-conversion and data-processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

According to certain embodiments, a method by a radio node operating in multiple modes for power detection includes operating in a first mode. While operating in the first mode power levels of transmissions on a channel are compared to a first threshold to determine whether the channel is free. While operating the radio node in the first mode, power levels within a specified range are detected during a first time period. In response to detecting the power levels within the specified range during the first time period, the radio node is switched to a second mode that is a duty-cycle mode. While operating the radio node in the second mode, the power levels of the transmissions on the channel are compared to a second threshold during a first portion of a duty cycle and to a third threshold during a second portion of the duty cycle to determine whether the channel is free. The third threshold is different from the second threshold. In response to determining that the channel is free, transmission is initiated on the channel.

According to certain embodiments, a radio node operating in multiple modes for power detection includes a memory storing instructions and a processor operable to execute the instructions. Executing the instructions causes the processor to operate in a first mode. While operating in the first mode, the processor compares power levels of transmissions on a channel to a first threshold to determine whether the channel is free. While operating in the first mode, the processor also detects that the power levels of the transmissions on the channel are within a specified range during a first time period. In response to the detection, the processor switches to a second mode that comprises a duty-cycle mode. While operating in the second mode, the processor compares the power levels of the transmissions on the channel to a second threshold during a first portion of a duty cycle and to a third threshold during a second portion of the duty cycle to determine whether the channel is free. The third threshold is different from the second threshold. In response to determining that the channel is free, the processor initiates transmission on the channel.

According to certain embodiments, a radio node is configured to operate in multiple modes for power detection. The radio node is further configured to, while operating in a first mode, compare power levels of transmissions on a channel to a first threshold to determine whether the channel is free. Additionally, while operating in the first mode, the radio node is further configured to detect that the power levels of the transmissions on the channel are within a specified range during a first time period. In response to detecting the power levels within the specified range during the first time period, the radio node is configured to switch to a second mode, wherein the second mode comprises a duty-cycle mode. While operating in the second mode comprising the duty-cycle mode, the radio is further configured to compare the power levels of the transmissions on the channel to a second threshold during a first portion of a duty cycle and to a third threshold during a second portion of the duty cycle to determine whether the channel is free.

The third threshold is different from the second threshold. In response to determining that the channel is free, the radio node is further configured to initiate transmission on the channel.

According to certain embodiments, a computer program stored on a non-transitory computer-readable medium is executed by a processor to cause the processor to operate in a first mode. While operating in the first mode, the processor compares power levels of transmissions on a channel to a first threshold to determine whether the channel is free. While operating in the first mode, the processor also detects that the power levels of the transmissions on the channel are within a specified range during a first time period. In response to the detection, the processor switches to a second mode that comprises a duty-cycle mode. While operating in the second mode, the processor compares the power levels of the transmissions on the channel to a second threshold during a first portion of a duty cycle and to a third threshold during a second portion of the duty cycle to determine whether the channel is free. The third threshold is different from the second threshold. In response to determining that the channel is free, the processor initiates transmission on the channel.

Some embodiments of the disclosure may provide one or more technical advantages. For example, in certain embodiments, the systems and methods may improve LTE-U/Wi-Fi coexistence. For example, in particular embodiments, the systems and methods may result in the ACK/NACK transmissions from Wi-Fi nodes not being overrun by LTE-U transmissions when the LTE-U node fails to sense the channel as busy due to the lower power levels of the ACK/NACK. As a result, the Wi-Fi transmission may be successfully completed and the contention window of the transmitting Wi-Fi node may not have to be unnecessarily backed off.

Another technical advantage may be that the same teaching can also be practiced by the Wi-Fi nodes to protect LTE-U transmissions. Specifically, the systems and methods may result in LTE-U transmissions not being run over by Wi-Fi transmissions from Wi-Fi nodes when the Wi-Fi node fails to sense the channel as busy. As a result, the LTE-U transmission may be successfully completed.

Still another technical advantage may be that the systems and methods disclosed herein are applicable to WLAN/Wi-Fi systems as well as LTE systems. Additionally, techniques disclosed herein are equally applicable to the case when LTE runs as a stand-alone or as LAA-LTE.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order.

| Abbreviation | Explanation |
|---|---|
| 3GPP | Third-Generation Partnership Program |
| ACK | Acknowledgement |
| AP | Access Point (for Wi-Fi) |
| CCA | Clear-Channel Assessment |
| CCA-ED | Clear-Channel Assessment Energy Detection |
| LAA-LTE | License-Assisted Access via LTE |
| LTE-U | LTE in unlicensed spectrum |
| LBT | Listen-Before-Talk |
| LTE | Long-Term Evolution |
| NACK | Negative Acknowledgement |
| P-cell | Primary Cell |
| Rx | Receive side |
| S-cell | Secondary Cell |
| STA | Station (User node for Wi-Fi) |
| Tx | Transmit side |

The invention claimed is:

1. A method by a radio node operating in multiple modes for power detection, the method comprising:

while operating the radio node in a first mode, comparing power levels of transmissions on a channel to a first threshold to determine whether the channel is free;

while operating the radio node in the first mode, detecting that the power levels of the transmissions on the channel are within a specified range during a first time period;

in response to detecting the power levels within the specified range during the first time period, switching the radio node to a second mode, wherein the second mode comprises a duty-cycle mode;

while operating the radio node in the second mode comprising the duty-cycle mode, comparing the power levels of the transmissions on the channel to a second threshold during a first portion of a duty cycle and to a third threshold during a second portion of the duty cycle to determine whether the channel is free, the third threshold being different from the second threshold;

while operating the radio node in the second mode, failing to detect power levels with the specified range during the second portion of the duty cycle, and in response to not detecting the power levels within the specified range during the second portion of the duty cycle, switching the radio node to the first mode; and in response to determining that the channel is free, initiating transmission on the channel.

2. The method of claim 1, wherein any one of the first threshold, the second threshold, and the third threshold is adaptive.

3. The method of claim 2, wherein any one of the first threshold the second threshold and the third threshold is selected based on a characteristic selected from the group consisting of:

a measured ambient noise floor of the channel;

antenna gain and number of transmit antennas;

a maximum EIRP of the radio node within an unlicensed band;

a maximum EIRP within a transmission burst following a listen-before-talk procedure;

a transmission bandwidth;

estimated load on the channel; and
whether the radio node is indoors or outdoors.

4. The method of claim 1, wherein detecting power levels within the specified range during the first time period comprises:
counting a number of measurements within the specified range; and
switching the radio node to the second mode in response to determining that the number of measurements within the specified range within the first time duration is greater than a predefined threshold.

5. The method of claim 1, wherein detecting power levels within the specified range during the first time period comprises a step selected from the group consisting of:
determining that a percentage of power levels within the specified range during the first time period is greater than a predefined threshold;
determining that a duration of a received power signal within the specified range during the first time period is greater than a predefined threshold; and
filtering one or more sample values within the detected power levels within the specified range during the first time period.

6. The method of claim 1, wherein the specified range during the first time period has an upper level and a lower level.

7. The method of claim 6, wherein any one of the upper level and the lower level of the specified range during the first time period are adaptive.

8. The method of claim 7, wherein any one of the upper level, the lower level, the first time period, the second time period, and the third time period is adapted based on at least one of:
antenna gain and number of transmit antennas;
a maximum EIRP of the radio node within an unlicensed band;
a maximum EIRP within a transmission burst following a listen-before-talk procedure;
a transmission bandwidth;
estimated load on the channel; and
whether the radio node is indoors or outdoors.

9. The method of claim 1, wherein the first time period is adaptive.

10. The method of claim 1, wherein the first portion of the duty cycle is performed for a second time period and the second portion of the duty cycle is performed for a third time period.

11. The method of claim 10, wherein the at least one of the second time period and the third time period is adaptive.

12. The method of claim 1, wherein the radio node comprises a wireless device.

13. The method of claim 1, wherein the radio node comprises a network node.

14. A radio node operating in multiple modes for power detection, the radio node comprising:
a memory storing instructions; and
a processor operable to execute the instructions to cause the processor to:
while operating in a first mode, compare power levels of transmissions on a channel to a first threshold to determine whether the channel is free;
while operating in the first mode, detect that the power levels of the transmissions on the channel are within a specified range during a first time period;
in response to detecting the power levels within the specified range during the first time period, switch to a second mode, wherein the second mode comprises a duty-cycle mode;
while operating in the second mode comprising the duty-cycle mode, compare the power levels of the transmissions on the channel to a second threshold during a first portion of a duty cycle and to a third threshold during a second portion of the duty cycle to determine whether the channel is free, the third threshold being different from the second threshold,
while operating in the second mode, failing to detect power levels with the specified range during the second portion of the duty cycle, and in response to not detecting the power levels within the specified range during the second portion of the duty cycle, switching to the first mode; and
in response to determining that the channel is free, initiate transmission on the channel.

15. The radio node of claim 14, wherein any one of the first threshold, the second threshold, and the third threshold is selected based on a characteristic selected from the group consisting of:
a measured ambient noise floor of the channel;
antenna gain and number of transmit antennas;
a maximum EIRP of the radio node within an unlicensed band;
a maximum EIRP within a transmission burst following a listen-before-talk procedure;
a transmission bandwidth;
estimated load on the channel; and
whether the radio node is indoors or outdoors.

16. The radio node of claim 14, wherein the processor is further operable to execute the instructions to cause the processor to detect power levels within the specified range during the first time period by:
counting a number of measurements within the specified range; and
switching to the second mode in response to determining that the number of measurements within the specified range within the first time duration is greater than a predefined threshold.

17. The radio node of claim 14, wherein detecting power levels within the specified range during the first time period comprises a step selected from the group consisting of:
determining that a percentage of power levels within the specified range during the first time period is greater than a predefined threshold;
determining that a duration of a received power signal within the specified range during the first time period is greater than a predefined threshold; and
filtering one or more sample values within the detected power levels within the specified range during the first time period.

18. The radio node of claim 14, wherein the specified range during the first time period has an upper level and a lower level.

19. The radio node of claim 18, wherein any one of the upper level and the lower level of the specified range during the first time period are adaptive.

20. The radio node of claim 14, wherein the first time period is adaptive.

21. The radio node of claim 14, wherein the first portion of the duty cycle is performed for a second time period and the second portion of the duty cycle is performed for a third time period.

22. The radio node of claim 21, wherein the at least one of the second time period and the third time period is adaptive.

23. The radio node of claim 14, wherein any one of the upper level, the lower level, the first time period, the second time period, and the third time period is adapted based on at least one of:
    a measured ambient noise floor of the channel;
    antenna gain and number of transmit antennas;
    a maximum EIRP of the radio node within an unlicensed band;
    a maximum EIRP within a transmission burst following a listen-before-talk procedure;
    a transmission bandwidth;
    estimated load on the channel; and
    whether the radio node is indoors or outdoors.

24. The radio node of claim 14, wherein the radio node comprises a wireless device.

25. The radio node of claim 14, wherein the radio node comprises a network node.

26. A computer program stored on a non-transitory computer-readable medium that is executed by a processor to cause the processor to:
    while operating a radio node in a first mode, compare power levels of transmissions on a channel to a first threshold to determine whether the channel is free;
    while operating the radio node in the first mode, detect that the power levels of the transmissions on the channel are within a specified range during a first time period; in response to detecting the power levels within the specified range during the first time period, switch the radio node to a second mode, wherein the second mode comprises a duty-cycle mode;
    while operating the radio node in the second mode comprising the duty-cycle mode, compare the power levels of the transmissions on the channel to a second threshold during a first portion of a duty cycle and to a third threshold during a second portion of the duty cycle to determine whether the channel is free, the third threshold being different from the second threshold,
    while operating in the second mode, failing to detect power levels with the specified range during the second portion of the duty cycle, and in response to not detecting the power levels within the specified range during the second portion of the duty cycle, switching to the first mode; and
    in response to determining that the channel is free, initiate transmission on the channel.

\* \* \* \* \*